No. 781,714. Patented February 7, 1905.

UNITED STATES PATENT OFFICE.

JOHN CAMPBELL AND WILLIAM A. RUSHWORTH, OF CHICAGO, ILLINOIS, ASSIGNORS, BY MESNE ASSIGNMENTS, TO SCHOELLKOPF, HARTFORD & HANNA COMPANY, OF BUFFALO, NEW YORK, A CORPORATION.

DEPILATING COMPOSITION.

SPECIFICATION forming part of Letters Patent No. 781,714, dated February 7, 1905.

Application filed December 7, 1903. Serial No. 184,133.

*To all whom it may concern:*

Be it known that we, JOHN CAMPBELL and WILLIAM A. RUSHWORTH, citizens of the United States, and residents of Chicago, in the county of Cook and State of Illinois, have invented a new and useful Improvement in Depilatory Compositions, of which the following is a specification.

This invention relates to compositions for the removal of hair from the hides and skins of animals preparatory to tanning.

It is well known that sodium sulfid has great depilatory powers, but that hides depilated by sodium sulfid or a composition which contains sodium sulfid as the preponderating ingredient become dry and brittle after a few months, lose strength rapidly, and crack on the grain side, and that the hair removed from hides by treatment with this substance possesses little strength and is of no value. The use of depilatories consisting largely of sodium sulfid is therefore confined mainly to the treatment of sheep-pelts, because the skin thereof is of little value and injury to such skins is of little consequence.

The object of this invention is to produce a depilatory composition which can be used in the form of a watery solution in which the hides are immersed or steeped and which operates quickly and effectively in loosening the hair without injuring either the skin or the hair.

This improved composition consists mainly of calcium sulfhydrate and barium hydrate and contains barium hydrate in excess or as the preponderating ingredient.

In preparing this improved composition in the preferred manner we mix approximately, by weight, sodium fulfid, six parts; hydrate of calcium, eighteen parts, and hydrate of barium, preferably commercial, seventy-six parts. This composition is dissolved in warm water in the proportion of about four (4) pounds of the composition to ninety-six (96) pounds of warm water. The sodium sulfid combines in the solution with the hydrate of calcium, forming calcium sulfhydrate, ($CaS_2H_2 6H_2O$,) so that the solution contains calcium sulfhydrate and hydrate of barium in excess. The calcium sulfhydrate is preferably produced as above described and by the use of sodium sulfid, but any other suitable metallic sulfid, polysulfid, or monosulfid may be used. The hides or skins are steeped in this solution and within a comparatively short period of time, usually about twenty-four hours, the hair becomes quite loose, so that it can be easily removed upon the beam without injury to the hide, skin, or hair.

The composition contains barium hydrate in excess or as the preponderating ingredient and does not dissolve or remove any part of the gelatinous tissue, grain, or substance of the hide or dissolve the hair-bulbs, as sodium sulfid does, but acts mainly by expanding the skin or hide, thereby loosening the hair-bulbs, so that the hair can be readily removed on the beam. The hide retains its natural suppleness, although increasing somewhat in weight, and the hair retains its natural strength even if the hide is allowed to remain immersed in the solution longer than is necessary to loosen the hair. The hides require no baiting or liming after treatment with the solution and are placed in a very receptive condition for the tanning material. The proportion of sodium sulfid in the composition is so small that this ingredient does not act to any material extent as a depilatory, but mainly to freshen and restore the grain and give the skin plumpness.

We claim as our invention—

1. The herein-described depilatory composition consisting of barium hydrate and calcium sulfhydrate, said composition containing barium hydrate in excess or as the preponderating ingredient and being suitable for the formation of a watery solution in which the hides or skins are steeped, substantially as set forth.

2. The herein-described depilatory composition consisting of barium hydrate, calcium hydrate and sodium sulfid in substantially the proportions set forth, said composition containing barium hydrate in excess or as the preponderating ingredient, and being suitable for the formation of a watery solution in which the hides or skins are steeped, substantially as set forth.

Witness our hands this 30th day of November, 1903.

JOHN CAMPBELL.
  WILLIAM A. RUSHWORTH.

Witnesses:
  C. H. CAMPBELL,
  JOHN H. LERCH.